(12) United States Patent
Van Der Wolf et al.

(10) Patent No.: US 7,706,377 B2
(45) Date of Patent: Apr. 27, 2010

(54) VIDEO PROCESSING CIRCUIT AND METHOD OF VIDEO PROCESSING

(75) Inventors: Pieter Van Der Wolf, Eindhoven (NL); Abraham Karel Riemens, Eindhoven (NL); Om Prakash Gangwal, Eindhoven (NL)

(73) Assignee: NXP B.V., Eindhoven (NL)

( * ) Notice: Subject to any disclaimer, the term of this patent is extended or adjusted under 35 U.S.C. 154(b) by 665 days.

(21) Appl. No.: 10/591,390

(22) PCT Filed: Feb. 25, 2005

(86) PCT No.: PCT/IB2005/050702

§ 371 (c)(1),
(2), (4) Date: Sep. 1, 2006

(87) PCT Pub. No.: WO2005/088982

PCT Pub. Date: Sep. 22, 2005

(65) Prior Publication Data
US 2007/0165712 A1    Jul. 19, 2007

(30) Foreign Application Priority Data
Mar. 3, 2004    (EP)    ................... 04100847

(51) Int. Cl.
*H04L 12/28* (2006.01)
(52) U.S. Cl. .............. 370/394; 370/390; 370/395; 370/396; 370/400; 386/68; 386/111; 386/123; 375/240; 375/240.24; 375/240.25; 375/240.28
(58) Field of Classification Search ............... 370/390, 370/394, 395, 396, 400, 401; 375/240, 240.24, 375/240.25, 240.26, 240.28, 240.31; 386/68, 386/111, 123
See application file for complete search history.

(56) References Cited

U.S. PATENT DOCUMENTS

| 5,621,464 A | 4/1997 | Teo et al. |
| 5,668,599 A | 9/1997 | Cheney et al. |

(Continued)

*Primary Examiner*—Ayaz R Sheikh
*Assistant Examiner*—Andrew C Lee

(57) ABSTRACT

Video stream processing, such as processing that includes MPEG decoding an subsequent post-processing involves using signal processing circuitry (102, 106) to execute a first and a second video stream processing function. The first video stream processing function produces frame data of successive video frames in a temporally ordered output sequence of frames. The second video stream processing function uses the frame data in an ordered input sequence of frames that differs from the output sequence, for example because later P-frames are needed to decode B frames. The frame data is buffered between application of the first and second video processing function to the frame data. A first and a second. buffer memory (12, 106) are used. The first buffer memory (12) is coupled to the signal processing circuitry via a shareable channel (15) such as an external IC terminals, but the processing circuitry does not use the shareable channel (15) to access the second buffer memory (106). The second video processing function reads frame data from first and second ones of the frames selectively from the first and second buffer memory (12, 106) respectively. The second ones of the frames occur in the same temporal order in both the input and output sequence. The first ones of the frames contain at least all particular frames whose position relative to the second ones of the frames in the output sequence differs from the position of the particular frames relative to the second ones of the frames in the input sequence.

15 Claims, 2 Drawing Sheets

U.S. PATENT DOCUMENTS

| | | | |
|---|---|---|---|
| 5,668,601 A * | 9/1997 | Okada et al. | 375/240.25 |
| 5,729,303 A * | 3/1998 | Oku et al. | 348/716 |
| 5,909,224 A * | 6/1999 | Fung | 345/531 |
| 5,937,138 A * | 8/1999 | Fukuda et al. | 386/112 |
| 6,091,776 A * | 7/2000 | Linzer | 375/240.12 |
| 6,094,457 A * | 7/2000 | Linzer et al. | 375/240.12 |
| 6,310,921 B1 * | 10/2001 | Yoshioka et al. | 375/240.26 |
| 6,470,051 B1 * | 10/2002 | Campisano et al. | 375/240.21 |
| 6,477,204 B1 * | 11/2002 | Fukushima et al. | 375/240.28 |
| 6,542,541 B1 * | 4/2003 | Luna et al. | 375/240.01 |
| 6,611,624 B1 * | 8/2003 | Zhang et al. | 382/232 |
| 6,690,726 B1 | 2/2004 | Yavits et al. | |
| 6,785,464 B1 | 8/2004 | Kato | |
| 6,792,047 B1 * | 9/2004 | Bixby et al. | 375/240.26 |
| 6,871,001 B1 * | 3/2005 | Okada | 386/6 |
| 6,993,081 B1 * | 1/2006 | Brunheroto et al. | 375/240.28 |
| 7,065,141 B2 * | 6/2006 | Okada | 375/240.25 |
| 7,408,587 B2 * | 8/2008 | Matsutani et al. | 348/441 |
| 2001/0011326 A1 | 8/2001 | Yoshikawa et al. | |
| 2001/0043654 A1 | 11/2001 | Yamazaki | |
| 2003/0123849 A1 | 7/2003 | Nallur et al. | |
| 2006/0153540 A1 * | 7/2006 | Itoh et al. | 386/112 |
| 2006/0165387 A1 | 7/2006 | Itoh et al. | |

* cited by examiner

VIDEO PROCESSING CIRCUIT AND METHOD OF VIDEO PROCESSING

The invention relates to a video processing circuit and to a method of video processing.

Hardware that performs video processing generally requires buffer memory for storing frame data from image frames that has to be processed. For conventional video processing it usually suffices to have a single frame buffer or a pair of frame buffers into and from which successive frames are written and read alternatingly. Processing functions that use the data, such as display driver functions or signal conversion functions, cyclically read the frames from the buffer memory or memories.

U.S. Pat. No. 5,909,224 describes an apparatus for MPEG decoding. As is well known, MPEG uses different types of video frames, viz. I frames, P frames and B frames. Decoding results in a stream of successive frames that have been codes as I, P, or B frames. During decoding, P frames are generated by making updates to an I frame that precedes the P frame in the stream. B frames are generated using updates to an I frame or a P frame that precedes the B frame in the stream and/or a P frame that follows the B frame in the stream. Hence, P frames are computed before B frames that occur before the P frames in the resulting stream of decoded frames.

In the case of MPEG decoding, buffer memory for concurrent storage of (parts of) at least three frames is needed: memory for an I frame and a P frame from which other (P or B) frames can be derived by updating and memory for at least part of such a derived frame.

U.S. Pat. No. 5,909,224 describes, how frame buffers are made available for a new I, P or B frame once the old contents of a frame buffer are no longer needed. The circuit used by U.S. Pat. No. 5,909,224 includes a bus that couples a processor that decodes the frames and SDRAM memory for storing the frames. Other circuits are also coupled to the bus. Typically, a printed circuit board containing different integrated circuits will be used: one containing the processor and one or more containing the SDRAM memory. As a result data transfers for accessing the frame buffers compete for bus bandwidth with accesses for other purposes.

This bandwidth problem is aggravated when the decoded frames are used for further (non-MPEG decoding inherent) video post-processing. In this case, an additional processor or process has to access the frame buffers to read the frames in the order in which they belong in the stream. This requires additional memory accesses, which also have to compete for the available bandwidth.

To a certain extent, the competition can be relieved by the use of a data cache memory, which retains copies of frame data that the decoder writes to external memory. This makes it possible to avoid reading from the external memory if the cache contains copied data. However, a complete elimination of competition would require a data cache that is at least sufficiently large to store four frames and that other processes cannot cause the frames to be removed from cache. A cache of this size is expensive, especially if it has to be provided taking up silicon area on-chip together with the processor(s) that perform the signal processing operations. Moreover, the required cache management would complicate the circuit and introduce undeterministic delays if other processes are involved as well.

Among others, it is an object of the invention to provide for a circuit for processing a stream of video data in which a bandwidth limited memory, such as an off-chip memory, is used, and in which use of access bandwidth to the bandwidth limited memory is reduced.

Among others, it is an object of the invention to avoid at least some of the problems that are inherent in use of cache techniques.

A first video processing function, such as an MPEG decoding function, that produces frame data from a compressed stream of video frames is executed as well as a second video processing function that uses the frame data as input. The second function uses the frames in a temporal order, typically the order of display, which differs from the temporal order in which the first video processing function produces the frames. A first and a second buffer memory are provided for buffering frame data between the first and second video processing function. The first buffer memory, which is typically a memory external to an integrated circuit (IC) that contains the signal processing circuitry that executes the first and second video processing function, is connected to the signal processing circuitry via a channel that is subject to bandwidth sharing. The connection from the processing circuitry to the second buffer memory, which is typically an internal memory in the IC that contains the signal processing circuitry, does not run through this channel. A separate connection to the second buffer memory may be used, or part of the same connection as for the first memory on which some bandwidth sharing may occur, however, without using a connection that extends all the way to the first memory. In this way power consumption may be reduced as well, since accessing external memory typically consumes more power.

It should be appreciated that, although the invention is especially advantages for MPEG decoding, the invention is not limited to MPEG decoding and applies to other types of processing functions as well.

When the second video processing function reads frame data, the second video processing function indicates whether the data must be read from the first buffer memory or from the second buffer memory. The second video processing function reads frame data from selected frames from the second buffer memory (typically IC internal memory). Thus, bandwidth use on the channel to the first buffer memory is reduced. The selected frames are frames that are written and read in the same temporal sequence by the first video processing function and the second video processing function respectively.

The second video processing function reads other frames from the first buffer memory (typically IC external memory). These other frames include at least all frames that are written and read at mutually different positions relative to the selected frames that the second processing function reads from the second buffer memory (typically IC internal memory). The first and second video processing function produce and consume the data that is communicated via the second buffer memory in the same order and because the data is produced and consumed by the video processing functions, with small amounts at a time. This makes it possible to keep the second buffer memory (or the amount of memory space used in that buffer memory) quite small, typically less than needed for a complete frame, e.g. for less than twenty image lines, by reading the frame data of the selected frames within a short time interval after it has been produced. When the second video processing function needs pixel data from a sliding window for example, this time interval need not be longer than necessary to receive the number of lines that is included in the window. After that time interval the oldest data can be overwritten in the second buffer memory.

Preferably, further bandwidth is saved on the channel to the first buffer memory when the first video processing function does not write frame data from frames to the first buffer memory in the case of at least some of the frames that the second video processing function reads from the second memory.

In one embodiment the first video processing function includes MPEG decoding. In this case the second video processing function preferably reads B frames and/or I frames from the second buffer memory and the other frames, always including the P frames, from the first buffer memory. When the second video processing function reads the I frames from the second buffer memory the first video processing function preferably writes copies of the I frames to both the first and second buffer memory, the former for use by the first video processing function during decoding. When the second video processing function reads the B frames from the second buffer memory the first video processing function preferably does not write copies to both the first and second buffer memory, since the first video processing function does not use these B frames in further decoding (and provided no other video processing functions need access to the B frames from the first (large) buffer memory).

However, it should be appreciated that the invention is not limited to MPEG decoding. In other embodiments than those involving MPEG decoding the first video stream processing function writes all frames to the first buffer memory and all frames that will be read in normal temporal to the second buffer memory. This makes it possible to reduce resource use and/or power consumption during reading of the latter frames. In a first further embodiment no other frames are written to the second buffer memory, to save further power consumption. But in another embodiment, all frames are written to the second buffer memory, which simplifies writing and results only in a little more power consumption. In a further embodiment the first video processing function reads first ones of the frames from the first buffer memory only. This simplifies reading and still saves bandwidth, since the second processing function reads at least some frames from the second buffer memory. In a further embodiment the first video processing function reads frames from the first buffer memory only and the second video processing function reads frames from the second buffer memory only. This further reduces bandwidth use and/or power consumption due to the second video processing function.

These and other objects and advantageous aspects of the invention will be described by means of examples using the following figures.

Figure 1:
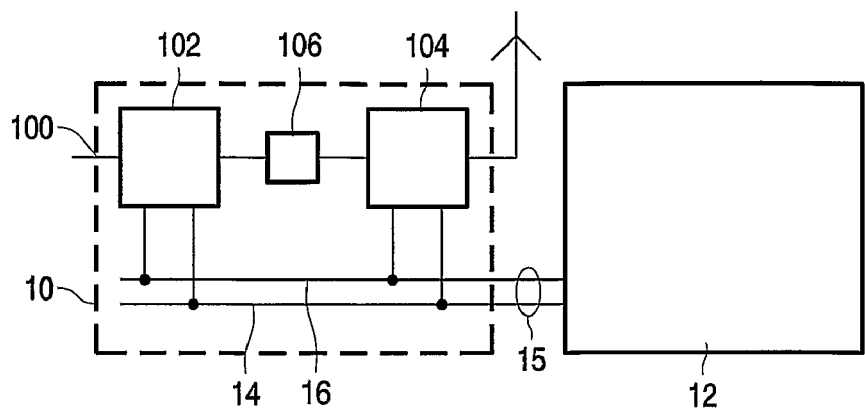
FIG. 1 shows a video decoding and processing circuit

FIG. 1 shows a video decoding and processing circuit with a processing integrated circuit 10 and a memory integrated circuit 12 coupled by an address/data bus 14, 16. Processing integrated circuit 10 contains a decoder processor 102, a post-processor 104 and an internal memory 106. Decoder processor 102 has an input coupled to an external input 100 of processing integrated circuit 10, for receiving a compressed video stream. Decoder processor 102 and post-processor 104 are coupled to memory integrated circuit 12 via an external interface 15 of address/data bus 14, 16. Moreover, decoder processor 102 and post-processor 104 are coupled to each other via internal memory 106.

In one embodiment internal memory 106 is a FIFO buffer memory that need not explicitly be addressed by decoder processor 102 and post-processor 104. In another embodiment internal memory is a relatively small addressable memory. For filtering purposes, for example, it is often necessary to execute successive computations that each require access to pixel data for a sliding window of neighboring pixels on a plurality of lines. In this case, it must be possible to address data in internal memory for different pixels from a window of pixels in a frame.

Typically, post-processor 104 is designed to use different instructions to indicate whether data should be read from internal memory 106 and memory integrated circuit 12 respectively, or preferably post-processor 104 uses read instructions with addresses in different address ranges to indicate whether data should be read from internal memory 106 and memory integrated circuit 12.

In operation, decoder processor 102 receives an MPEG encoded video stream from external input 100 and generates decoded frames from the encoded stream. During decoding decoder processor 102 stores and retrieves decoded I and P frames using memory integrated circuit 12 via data address bus 14, 16. Post-processor 104 processes decoded frames, e.g. by applying a spatial filtering operation, color modification etc. (Without deviating from the invention decoder processor 102 may also perform some post-processing, e.g. post-processing for conversion of individual pixel values).

The memory to which decoder processor 102 writes frame data changes from frame to frame. Decoder processor 102 is arranged to write part of the frames to internal memory 106 and part or all of the frames to memory integrated circuit 12. Copies of a number of frames may also be written to both internal memory 106 and memory integrated circuit 12. Similarly, the memory from which post-processor 104 reads frame data changes from frame to frame. Thus, part of the decoded frames passes from decoder processor 102 to post-processor 104 via internal memory 106 and part of the frames passes via memory integrated circuit 12. A number of different distributions of frames over internal memory 106 and memory integrated circuit 12 may be used.

Figure 2:
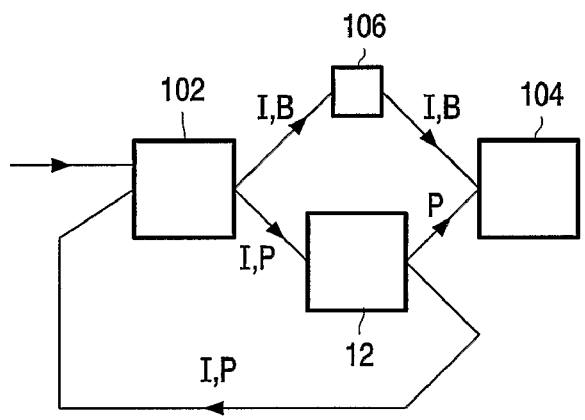
FIGS. 2-5 illustrate data flow to and from memories

FIG. 2 schematically illustrates a first embodiment wherein I and B frame data passes from decoder processor 102 to post-processor 104 via internal memory 106 and P frame data passes via memory integrated circuit 12. Decoder processor 102 writes data from I and P frames to memory integrated circuit 12 and reads the I and P frame data from memory integrated circuit 12 for decoding.

In operation, decoder processor 102 produces frames in repeated cycles of an I frame, followed by a number of successive sub-cycles of a number of B frames followed by a P frame. Table I illustrates the sequence of production of frames of different type and the memory in which decoder processor 102 writes the frames. In different columns different frame cycles (numbered 1-10) are listed. Rows are provided for memory integrated circuit 12 and internal memory 106 and entries in the table indicate the type of frame produced in a cycle and the memory (or memories) to which decoder processor 102 writes the frame data.

TABLE I

| | Frame writing | | | | | | | | | |
|---|---|---|---|---|---|---|---|---|---|---|
| | 1 | 2 | 3 | 4 | 5 | 6 | 7 | 8 | 9 | 10 |
| 12 | I | P | | P | | P | | | I | P |
| 106 | I | | B | | B | | B | | I | |

Decoder processor 102 writes the I frame to both memory integrated circuit 12 and internal memory 106 (the former via address data bus 14, 16). Next decoder processor 102 generates and writes the P frame to memory integrated circuit 12 only. Subsequently decoder processor 102 generates and writes a number of B frames (only one shown for the sake of simplicity) to internal memory 106 only. Writing of a P frame and a number of B frames is repeated a number of times. After that decoder processor 102 repeats the cycle from the I frame, after waiting for a frame cycle prior to producing the I frame. For the production of the P frame, decoder processor 102 addresses and reads data from the preceding I frame from memory integrated circuit 12. For the production of the B frames decoder processor 102 reads data from the last produced P frame and/or the second last produced P frame or last produced I frame from memory integrated circuit 12.

Post-processor 104 reads these frames in the order of the I frame, and repeated sub-cycles, each of a number of B frames, followed by the P frame from which the B frames where produced. This is followed by a next cycle of I, P and B frames etc. Table II illustrates the sequence of reading of frames of different type and the memory from which decoder processor 102 reads the frames. In different columns different frame cycles (numbered 1-10) are listed. Rows are provided for memory integrated circuit 12 and internal memory 106 and entries in the table indicate the type of frame produced in a cycle and the memory (or memories) from which post-processor 104 reads the frame data.

TABLE II

| | Frame reading | | | | | | | | |
|---|---|---|---|---|---|---|---|---|---|
| 1 | 2 | 3 | 4 | 5 | 6 | 7 | 8 | 9 | 10 |
| 12 | | | P | | P | | P | | |
| 106 | I | | B | | B | | B | | I |

Post-processor 104 reads the I and B frames from internal memory 106 in the order in which these frames are produced. Post-processor 104 reads the P frames from memory integrated circuit 12 via address/data bus 14, 16. It is not necessary that data from an entire I or B frame is stored together in internal memory 106 at any time: during writing data from a frame may it overwrite earlier data from the frame if that earlier data has already been used by post-processor 104. Hence, the memory capacity of internal memory 106 may be less than needed for a full decoded frame. In the second frame cycle (when decoder processor produces the first P frame after the I frame) post-processor 104 pauses.

The frame cycles wherein decoder processor 102 and post-processor 104 pause are inserted to ensure that for those frames that are passed via internal memory 106 the delay between writing into internal memory 106 and reading from internal memory 106 is minimal, so that memory space for less than a full frame (e.g. only for a subset of lines from a frame) suffices. If a larger internal memory is used these pauses may be reduced or eliminated. The size of the memory space in internal memory 106 may be chosen such that the pauses stay within the bounds required for correct operation of the overall system (for example a digital TV) (e.g. to meet all deadlines for producing frames on the output of the overall system). A larger memory space gives smaller pauses. If a regular frame rate is needed after post-processor 104 (e.g. for display) a buffer memory (not shown) may be used after post-processor 104. In this case decoder processor 102 and post-processor 104 are made to operate (if not paused) above the regular frame rate. The buffer memory is read at the regular frame rate, so that the amount of buffered data increases until the frame cycle in which post-processor pauses.

It will be appreciated that in this way post-processor 104 uses no access cycles of bus 14, 16 to read I and B frames from memory integrated circuit 12. This reduces the bus occupation of address data bus 14, 16. In an embodiment wherein internal memory 106 is attached to bus 14, 16 it need not reduce bus occupation, but still reduces accesses to external memory which typically saves power consumption, avoids interference with other accesses to external memory and/or reduces access time.

Figure 3:
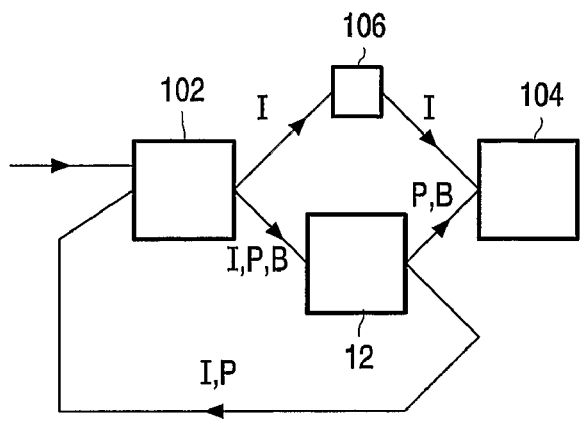

FIG. 3 schematically illustrates a second embodiment. In this embodiment the order of writing and reading of frames is that same as for FIG. 2, but instead of writing B frames to internal memory 106, decoder processor 102 writes the B frames to memory integrated circuit 12. Decoder processor 102 writes the I frame data to both internal memory 106 and memory integrated circuit 12. Post-processor 104 reads I frame data from internal memory 106 and P and B frame data from memory integrated circuit 12.

In this way post-processor 104 does not use access cycles of data/address bus 14, 16 to read I frame data from memory integrated circuit 12, thereby reducing access to memory integrated circuit 12. It may be noted that, in comparison with the embodiment of FIG. 3, the embodiment of FIG. 2 requires fewer access cycles on address/data bus 14, 16, because write and read cycles to bus 14, 16 for B frames are also eliminated.

Figure 4:
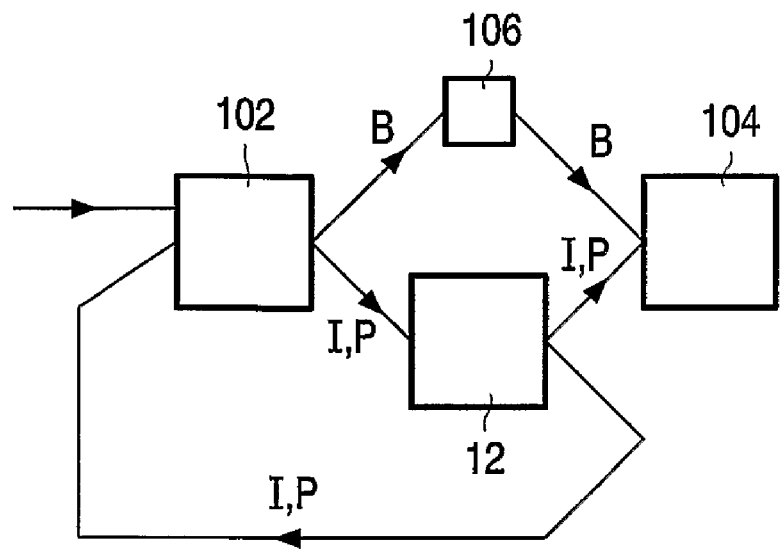

FIG. 4 schematically illustrates a third embodiment. In this embodiment the order of writing and reading frames is that same as for FIG. 2, but instead of writing a copy of the I frames to both internal memory 106 and memory integrated circuit 12 decoder processor 102 only writes the I frames to memory integrated circuit 12. Post-processor 104 reads I and P frame data from memory integrated circuit 12 and the B frame data from internal memory 106.

In this way post-processor 104 does not use access cycles of data/address bus 14, 16 to read B frames from memory integrated circuit 12, thereby reducing bus occupation. This reduces the bus occupation of address data bus 14, 16. It may be noted that, in comparison with the embodiment of FIG. 4, the embodiment of FIG. 2 requires fewer access cycles on address/data bus 14, 16, because read cycles to bus 14, 16 for I frames are also eliminated. As a result, however, a greater total number of write actions is required in FIG. 2, since copies of the I frames have to be written to both internal memory 106 and memory integrated circuit 12. This may lead to increased power consumption. However, access to internal memory generally involves less power consumption than access to external memory.

In the embodiment of FIG. 4 it is not necessary to make decoder processor 102 and post-processor 104 pause. In the frame cycle in which decoder processor 102 produces and writes an I frame, post-processor 104 reads the last preceding P frame from memory integrated circuit 12. In the next frame cycle decoder processor 102 produces and writes the first P frame and post-processor 104 reads the I frame. In the next frame cycle decoder processor 102 produces and writes a B frame and post-processor 104 reads this B frame from internal memory 106 while this B frame is being produced. Thus, all B frames can be read form internal memory 106 during operation of decoder processor 102, so that little memory is needed without pausing decoder processor 102 and post-processor 104. No need exists for frame rate regularisation buffering following post-processor 104.

Although the invention has been described for the sequence of frame writing and reading that is typical for MPEG decoding it will be appreciated that the invention can be applied to other decoding schemes or to encoding. Nor is the invention limited to writing all frames of a specific type to a specific memory (internal memory 106 or memory integrated circuit 12). It will be appreciated that less bandwidth is consumed already if some frames are not written to memory integrated circuit 12 or read from it.

An example is when a decoding scheme is used wherein final B frames immediately prior to an I frame are generated using a P frame that is processed by post-processor 104 before the final B frames. In this example the embodiment of FIG. 4 may be modified to store the final B frames in memory integrated circuit 12, the other B frames still being stored only in internal memory 106. This avoids the need to pause decoder processor 102 and post-processor 104 for a frame cycle when internal memory is small.

In an encoder integrated circuit a preprocessor may be followed by an encoder processor. In this case an internal memory may be used between the pre-processor and the encoder processor to buffer selected frames, so as to save memory bandwidth. For example, frames that will be encoded as B frames may be passed to the encoder processor via internal memory, other frames being passed via an external memory integrated circuit. Alternatively both frames that will be encoded as P and B frames may be passed to the encoder processor via internal memory, the frames that will be encoded as P frames also being written into the memory integrated circuit, the latter for use in B frame encoding.

It should be realized that the invention is not limited to the examples. For example, although it is preferred, in order to reduce power consumption, that frame data is not written into internal memory 106 if the frame data belongs to frames that post-processor 104 will read from memory integrated circuit 12, without deviating from the invention may be written into internal memory 106 nevertheless, without being read however.

Similarly, when data is passed via internal memory 106 in order to reduce bandwidth occupation to memory integrated circuit 12, it will be appreciated that internal memory 106 need not be used during periods in which the bandwidth is not scarce. Preferably internal memory is used according to one of the embodiments at least at times when bandwidth is scarce.

Furthermore, although a separate decoder processor 102 and post-processor have been shown by way of example, it will be understood that instead a single processor may be used, which runs two corresponding software processes. In this case internal memory 106 serves for interprocess communication and it may be implemented for example as a group of processor registers, or a register that functions as a FIFO between store and load instructions. On the contrary, decoder processor 102 and post-processor 104 may also be separate dedicated hardware circuits capable of executing their respective functions only.

Furthermore, although internal memory 106 is shown separate from address/data bus 14, 16 and address/data bus 14, 16 is shown to connect decoder processor 102, post-processor 104 and memory integrated circuit 12, it will be understood that different architectures may be used. For example, internal memory 106, decoder processor 102 and post-processor 104 may be coupled via an internal address/data bus of processing integrated circuit 10, memory integrated circuit 12 being coupled to decoder processor 102 and post-processor 104 via an external bus. In this case, the external bus may be coupled to the internal bus via a bus interface. Thus, the invention reduces bandwidth on the external bus, where the bandwidth is more constrained than on the internal bus.

Furthermore, although the invention is particularly useful for the example of FIG. 1 wherein a decoder processor 102 is used that writes data and later reads that data, it should be understood that the invention is not limited to this kind of processor.

Figure 5:
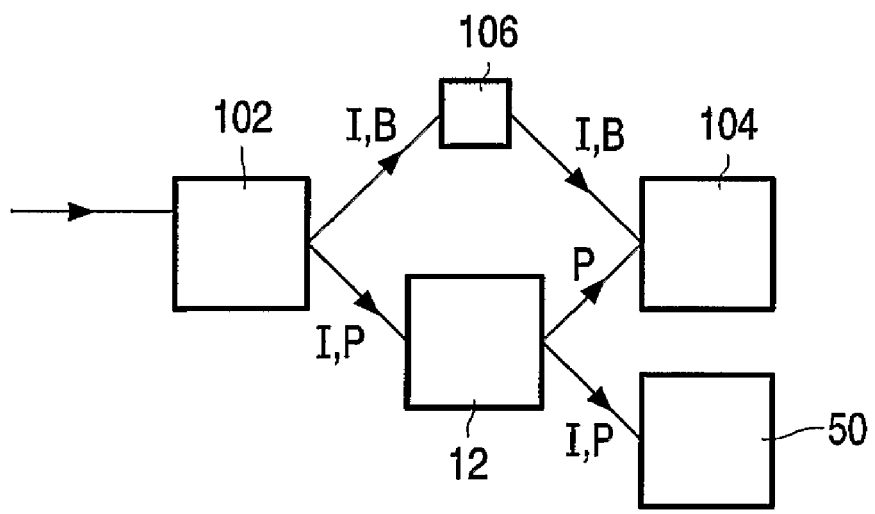

FIG. 5 illustrates a version of the embodiment of FIG. 2 wherein read operations like that of decoder processor 102 are performed instead by a third processor 50 for another purpose. In this embodiment a processor 102 may be used that does not read the frames (or performs other functions than decoding). Post-processor 104, like post-processor 104 of FIG. 2 does not require buffering of complete frames. The third processor 50, like decoder processor 102 requires buffering of some complete frames only. In this case the same write and read scheme may be used as described for FIG. 2, or any of the other described schemes.

The invention claimed is:

1. A video stream processing circuit, comprising:
   signal processing circuitry arranged to execute a first video stream processing function; and
   a first and second buffer memory coupled to the signal processing circuitry for buffering the frame data produced by the first video stream processing function, the first buffer memory being coupled to the signal processing circuitry via a shareable channel, the signal processing circuitry having access to the second buffer memory outside the shareable channel,
   wherein the first video stream processing function comprises writing frame data of successive video frames in a temporally ordered output sequence of frames into the first and/or second buffer memory;
   the signal processing circuitry being arranged to execute a second video stream processing function using the written frame data in a temporally ordered input sequence of frames that differs from the output sequence, the second video stream processing function being arranged to select to read the frame data of predetermined first and second ones of the frames selectively from the first and second buffer memory respectively, the second ones of the frames occurring in the same temporal order in both the input and output sequence, the first ones of the frames containing at least all particular frames whose position relative to the second ones of the frames in the output sequence differs from the position of the particular frames relative to the second ones of the frames in the input sequence.

2. The video stream processing circuit according to claim 1, comprising a first integrated circuit, which comprises the signal processing circuitry and the second buffer memory, and a second, separate integrated circuit that comprises the first buffer memory, the shareable channel forming part of a connection between the first and second integrated circuit.

3. The video stream processing circuit according to claim 1, wherein the second video stream processing function is arranged to read each item of frame data from the second buffer memory at respective times, the second video stream processing function being arranged to read a particular item of frame data from the second buffer memory before the first video stream processing function has written a full frame following that particular item of frame data.

4. The video stream processing circuit according to claim 1, wherein the first video stream processing function includes an MPEG decoding function, the first ones of the frames including at least decoded MPEG P-frames, the MPEG decoding function reading frame data from decoded MPEG I-frames and decoded MPEG P frames from the first buffer memory.

5. The video stream processing circuit according to claim 4, wherein the second ones of the frames include B frames.

6. The video stream processing circuit according to claim 5, wherein the signal processing circuitry writes B frames to the second buffer memory only.

7. The video stream processing circuit according to claim 4, wherein the second ones of the frames include I frames, the first video stream processing function writing copies of the I frames to both the first and second buffer memory.

8. The video stream processing circuit according to claim 7, wherein the second ones of the frames include B frames.

9. The video stream processing circuit according to claim 1, wherein the first video stream processing function comprises an MPEG decoding function, the second video stream processing function reading at least decoded MPEG P-frames from the first buffer memory.

10. The video stream processing circuit according to claim 1, wherein the first video stream processing function, or a third video stream processing function executed by the signal processing circuitry reads only selected ones of the frames from the first buffer memory, the first video processing function being arranged to write copies of the selected ones of the video frames that also are second ones of the frames to both the first and second buffer memory, the first video processing function writing second ones of the frames that are not selected ones of the video frames to the second buffer memory only.

11. The video stream processing circuit according to claim 1, wherein the second buffer memory has a capacity of less than one frame.

12. A video stream processing circuit, comprising:
signal processing circuitry arranged to execute a first video stream processing function; and
a first and second buffer memory coupled to the signal processing circuitry for buffering the frame data produced by the first video stream processing function, the first buffer memory being coupled to the signal processing circuitry via a shareable channel, the signal processing circuitry having access to the second buffer memory outside the shareable channel,
wherein the first video stream processing function comprises writing frame data of successive video frames in a temporally ordered output sequence of frames into the first and/or second buffer memory;
the signal processing circuitry being arranged to execute a second video stream processing function using the written frame data in a temporally ordered input sequence of frames that differs from the output sequence, the first video stream processing function being arranged to select to write the frame data of predetermined first and second ones of the frames selectively to the first and second buffer memory respectively, the second ones of the frames occurring in the same temporal order in both the input and output sequence, the first ones of the frames containing at least all particular frames whose position relative to the second ones of the frames in the output sequence differs from the position of the particular frames relative to the second ones of the frames in the input sequence.

13. The video stream processing circuit according to claim 12, wherein the second buffer memory has a capacity of less than one frame.

14. A method of video stream processing, the method comprising:
using signal processing circuitry to execute a first and a second video stream processing function, the first video stream processing function producing frame data of successive video frames in a temporally ordered output sequence of frames, the second video stream processing function using the frame data in an ordered input sequence of frames that differs from the output sequence;
buffering the frame data between application of the first and second video processing function to the frame data in a first and/or second buffer memory, the first buffer memory being coupled to the signal processing circuitry via a shareable channel, the signal processing circuitry not using the shareable channel to access the second buffer memory; and
reading frame data from predetermined first and second ones of the frames for use by the second video processing function selectively from the first and second buffer memory respectively, the second ones of the frames occurring in the same temporal order in both the input and output sequence, the first ones of the frames containing at least all particular frames whose position relative to the second ones of the frames in the output sequence differs from the position of the particular frames relative to the second ones of the frames in the input sequence.

15. The method of video stream processing according to claim 14, wherein the second buffer memory has a capacity of less than one frame.

* * * * *